Inventor:
Joseph P. Davenport
By Jno. A. Elliott
Atty.

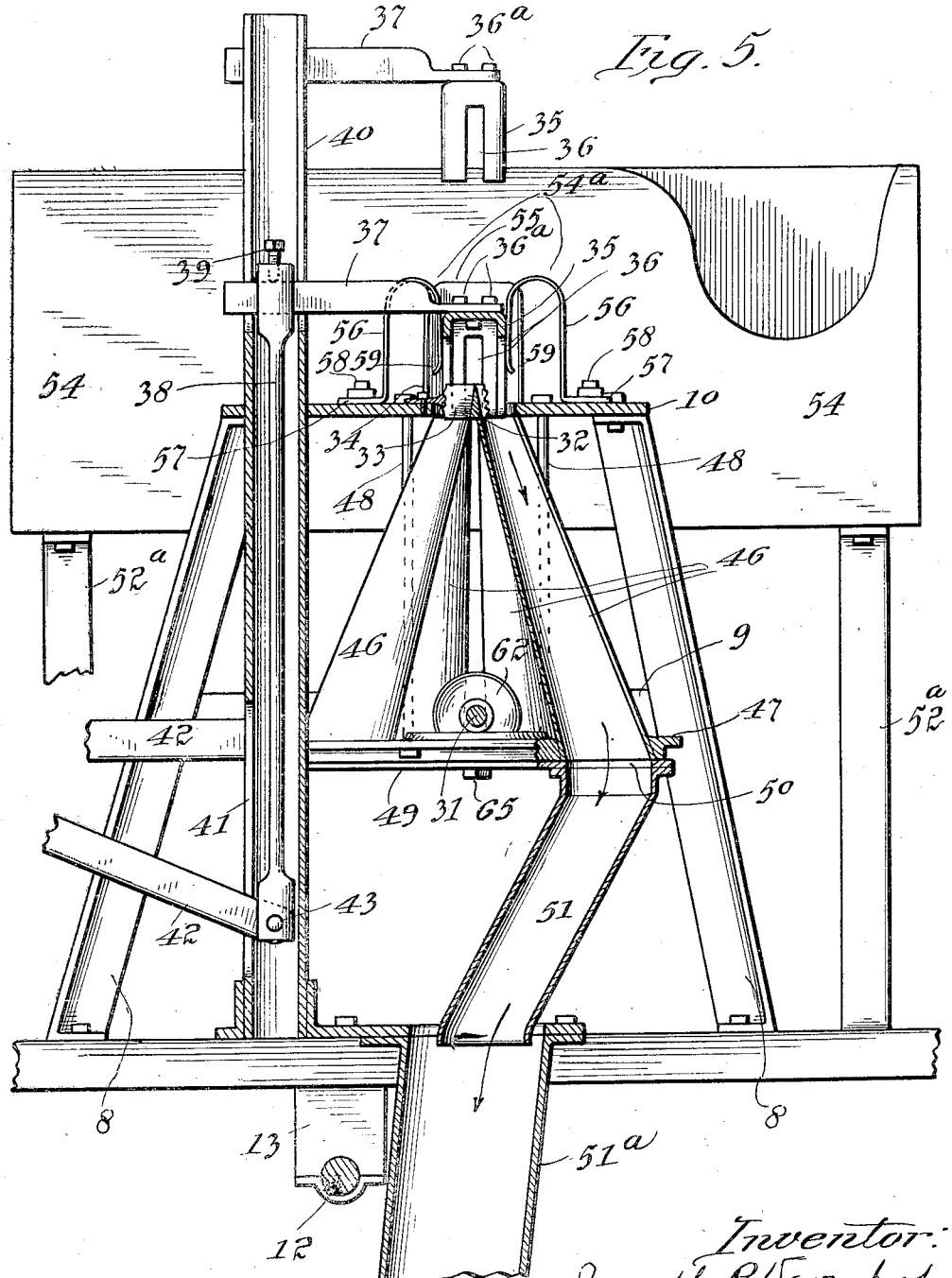

Patented Dec. 16, 1924.

1,519,397

UNITED STATES PATENT OFFICE.

JOSEPH P. DAVENPORT, OF WHEATON, ILLINOIS.

POTATO PLANTER.

Application filed March 29, 1920. Serial No. 369,816.

*To all whom it may concern:*

Be it known that I, JOSEPH P. DAVENPORT, a citizen of the United States, and a resident of Wheaton, in the county of Du Page and State of Illinois, have invented certain new and useful Improvements in Potato Planters, of which the following is a full, clear, and exact specification.

This invention relates to improvements in potato planting machines in which two potatoes are, by means of stationary crossed blades, successively severed into quarters, alternately directed through individual chutes for every quarter of both potatoes, depositing them upon a rotating disc-valve operated by the bevel gears located underneath the valve on which at least three cut quarters of one of two potatoes are always at rest and from which they successively discharge through a fixed downwardly converging spout, the diameter of the receiving end of which is substantially that of the disc-valve.

The potato planting machines, as above generally described, are, however, subject to the objection that the potatoes must be large enough for the crossed blades to sever them into quarters and that the receiving end of their spout is so large and its outlet necessarily so small that, notwithstanding the perfect timing of the potato pieces delivered to the spout, some of these pieces not infrequently strike and rebound from one side of the spout to the other, with the result that the rebounding potato piece is thereby delayed and consequently spaced in the ground too far away from the preceding piece and too close to the next following piece of potato.

One of the objects of my invention is to have a potato planting machine with which it is both possible and practicable for the crossed blades not only to quarter a large potato, but to simultaneously halve two small potatoes, and which, if desired, may be adjusted for the purposes of both.

A further object of my invention is to have the chute receiving the potato pieces discharged from the valve so constructed, arranged and operating that every piece of potato descending therethrough is prevented from striking against and rebounding from its walls and whereby the planted potato pieces will be uniformly spaced apart when planted in conformity with the timing of the valve for that purpose.

With these ends in view, my invention finds embodiment in certain features of novelty in the construction, combination and arrangement of parts by which the said objects and certain other objects are attained, all as hereinafter fully described with reference to the accompanying drawings and more particularly pointed out in the claims.

In said drawings,—

Fig. 5 is also an enlarged detail section taken approximately on the line 5—5 of Fig. 3.

Figure 1:
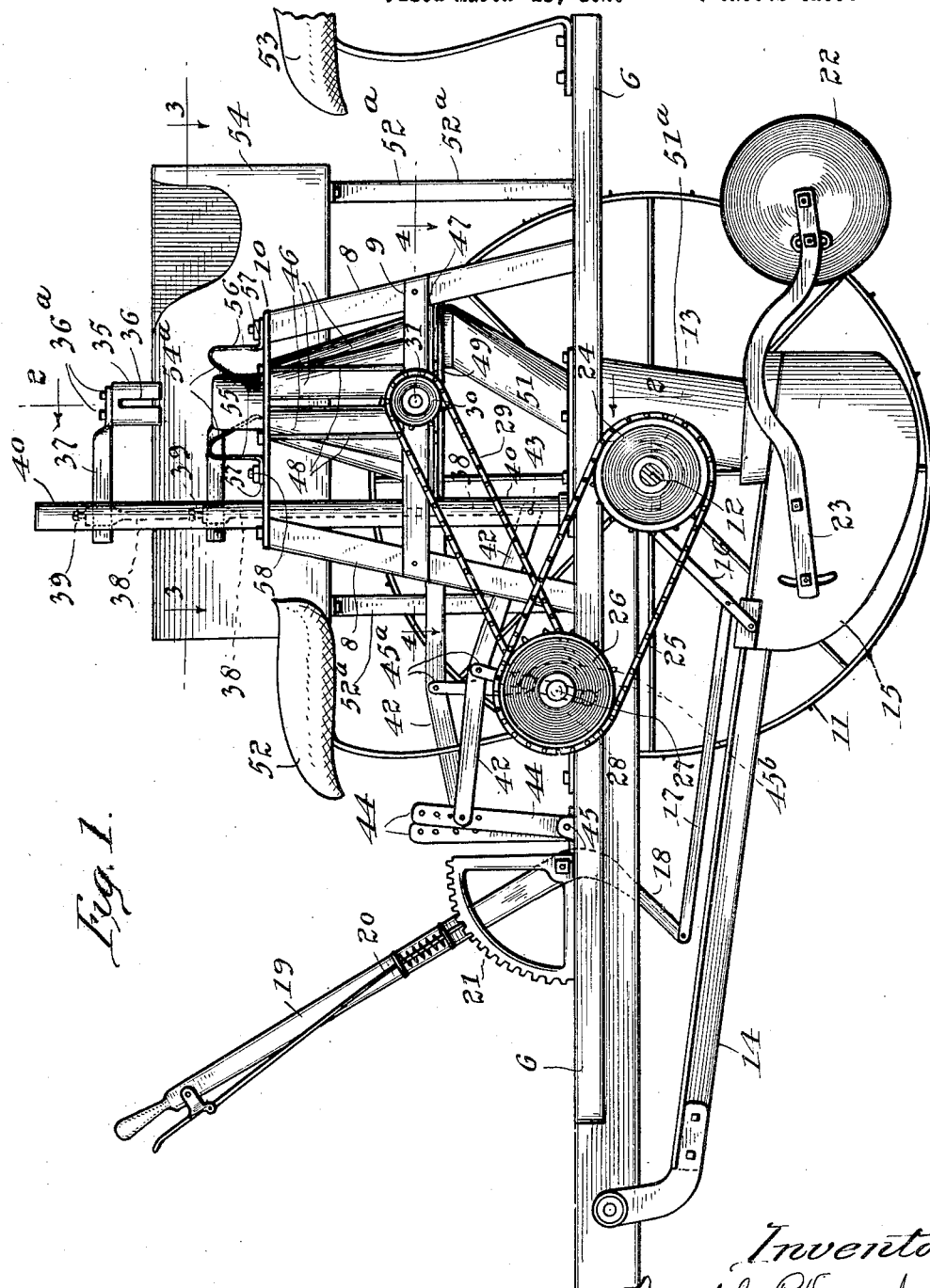
Fig. 1 is a side elevation of a potato planting machine in which my invention finds its embodiment.

In said drawings, 6—6 indicates the side bars of the base frame of the machine suitably connected by one or more cross bars 7 (see Fig. 2) mounted upon which are a suitable number of upright posts 8—8 connected about midway of their length by a cross bar 9 and at their upper end by a plate 10, the frame being supported on wheels 11, the axle 12 of which is journaled in suitable hangers 13 (see dotted lines in Fig. 1).

By means of a bar 14, pivoted towards the forward end of the frame of the machine, is a furrow-cutting plow 15, connected, as usual, with the axle by a link 16, pivoted to the plow in turn by link 17, with a bell-crank lever 18 or other suitable device, on a hand lever 19 provided with a detent 20, engaging a segment gear 21 and by means of which plow 15 is adjustable for furrows differing in depth, and which, following the planting of potatoes, as hereinafter described, is covered by means of rotating disc plow 22, secured to the furrow plow 15 by means of a bar 23.

Fixed to the axle 12 is a sprocket wheel 24 connected by a sprocket chain 25 with a sprocket wheel 26 on a shaft 27, on which shaft is also fixed (see dotted lines, Fig. 1) a smaller sprocket wheel 28. Connected by a sprocket chain 29, is a similar sprocket wheel 30 on a shaft 31 journaled in suitable bearings in one of the two cross bars 9—9.

Plate 10 is provided with two openings, in each of which are blades 32, 33 (see Fig. 2), crossing each other and secured at their ends to the plate by means of bolts 34. Directly above the two sets of crossed blades are plungers 35—35, provided with slots 36—36, crossing each other and registering with the opposing crossed blades, which plungers are operated alternately for pushing the potatoes against the blades for severing them, as hereinafter described.

Secured to the upper ends of the plungers 35 by bolts 36ª are bars 37, passing through the upper end of a rod 38 and adjustable therein by means of a screw bolt 39—39, for centering the plungers over their respectively opposing crossed cut blades, which rods 38—38 are confined in a hollow post 40, supported from the main frame of the machine, the posts 40 being each provided with an elongated slot 41, through each of which projects one end (see Figs. 1 and 5) of a rocker arm 42, secured to the rod by a pivot 43.

Rocker arms 42—42 are adjustably pivoted, as shown in Fig. 1, to upright links 44—44, pivotally supported from the frame by pivots 45.

Pivoted to the rocker arms intermediate their ends are links 45ª, the opposite ends of which are pivotally connected with crank arms 45ᵇ (see Fig. 2) formed in shaft 27 for the gear wheel 26.

For each of the openings in the crossed blades and in register therewith (see Figs. 4 and 5), are chutes 46, outwardly diverging thence towards their lower ends which are secured in a fixed plate 47, provided with perforations corresponding in number with the chutes, which plate is secured in its operative position by means of rods 48, passing through the plates 10 and 47 and tightened by suitable thumb nuts. Next below the spiderlike plate 47 is a rotating disc valve 49, provided with a single opening 50 adapted to successively register with the several chutes 46, through which opening the potato pieces descend by gravity and thence through a chute 51 and a funnel 51ª, in spaced relation, into the furrow made by the plow 15.

The machine is also provided with a driver's seat 52 within convenient reach of the lever 19 and also with a seat 53 for the operator, within convenient reach of potato bins 54—54 at each side of the machine supported by bars 52ª for alternately feeding potatoes to spring tongue hoppers 54ª, through which they are alternately pushed past the severing blades by the plungers 35.

So far as now described, the construction of the machine shown in the drawings is old and well-known, with the exception of the hoppers 54ª, which have heretofore been of circular form in cross-section, constructed of non-adjustable fingers and limited to the use of potatoes of a size adapting them to be divided into quarters by the severing blades; that the gear and the shaft for rotating the disc valve have been and necessarily were located in a plane below that for rotating the disc valve, the shaft for which was necessarily located below the underside thereof; and that the chute 51 was fixed and of a diameter greater than the disc valve, with the result that the potato pieces descending therethrough so frequently strike and rebound from one wall to the other that it has been found at times impossible to continuously equally space the potato pieces in the ground, notwithstanding their timely discharge by the disc valve for that purpose.

From the standpoint of economy in time and cost of seed potatoes, it has been found from practice desirable to provide such means by which it is both possible and practicable to utilize small potatoes for severing and planting, as well as large potatoes, and to also have the chute next below the disc valve so constructed and operated that there can be no rebounding of the potato pieces therein in their passage from the valve to the spout from which they discharge into their furrow, and whereby through the timing of the valve, their uniform spacing in the ground will be compelled.

To these ends, it is now to be pointed out that the hoppers shown herein (see Figs. 3 and 4) are elongated and consist of two curved end plates 55—55, and two sets of oppositely arranged spring tongues 56—56 in sets of four, each of which tongues has substantially the form of an inverted U and a right angle bend 57 at its base adjustably secured to the base-plate 10 by screw bolts 58, so that any tongue of one set may be adjusted towards and from the tongues of the other sets of tongues, which tongues and the curved plates form an elongated hopper, the free ends of the tongues being provided with an inward bend 59 for preventing their ends from catching on to or scraping the potatoes as they are being pushed between them by the plunger 35.

Figure 3:
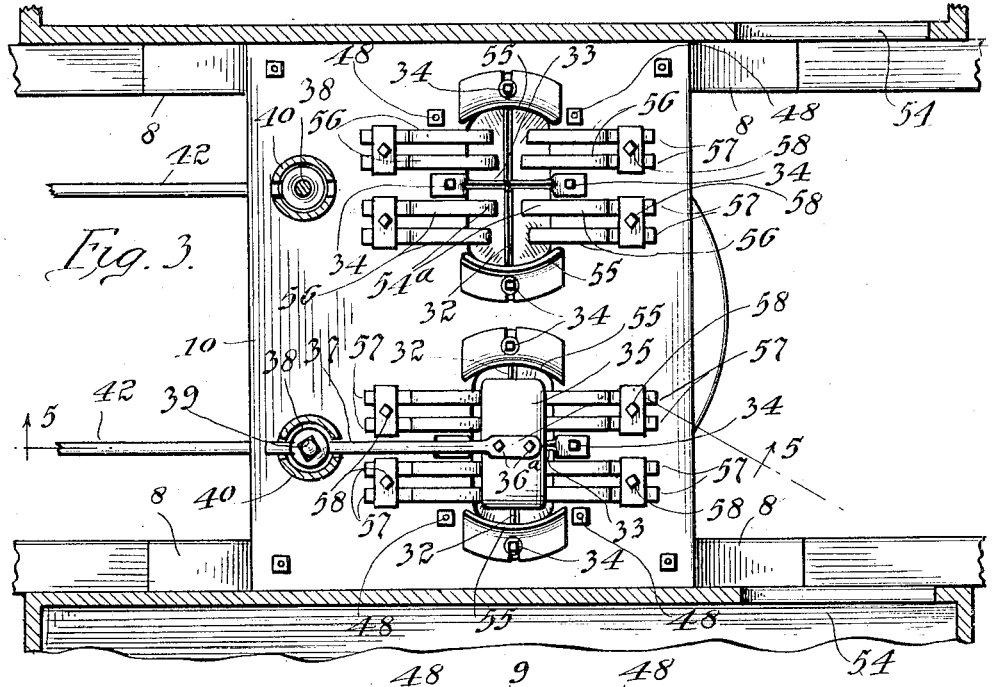
Fig. 3 is a horizontal section taken on the line 3—3 of Fig. 2.

The adjustability of the tongues provides a means for adapting the hoppers for the simultaneous reception of the blades for severing in half two small potatoes and for which particular purpose the inner two of the opposing tongues are adjusted nearer each other, as clearly shown in Fig. 3, than are their outer tongues, and so that when two small potatoes, which are usually more or less round, are dropped into the hoppers, they will move outwardly to contact with the curved plates and away from the intersection of the crossed blades, with the result that, with the descent of the plungers, they will each be severed in half, following which each piece will be discharged from the severing blades into its respectively opposing chute.

With the adjustment of the blades for the halving of two small potatoes, the hoppers are also adapted for single potatoes large enough for quartering, when said potatoes, as they are ordinarily, are of a length but shortly less than that of the hoppers, and of such length that they will be more or less balanced on the intermediate tongues, and forced thence between those two tongues by the plungers.

Figure 2:
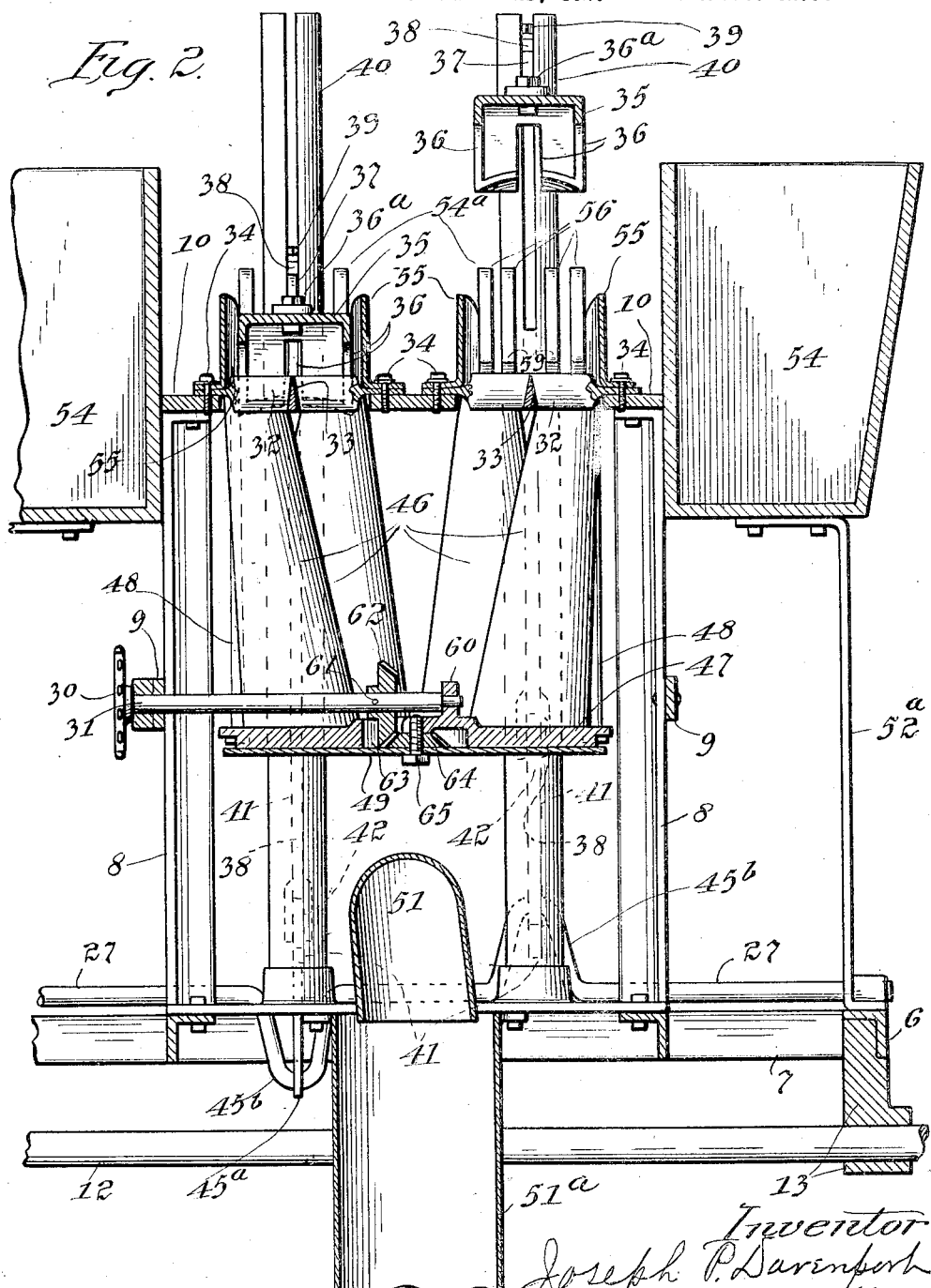
Fig. 2 is an enlarged detail section taken on the line 2—2 of Fig. 1 in the direction indicated by the arrows.
Figure 4:
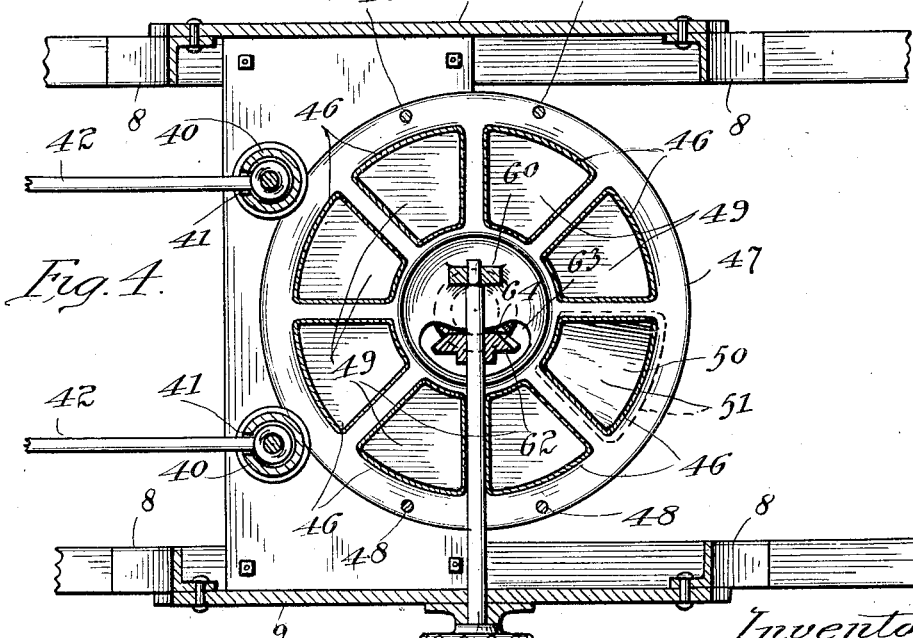
Fig. 4 is an enlarged detail section taken on the line 4—4 of Fig. 1.

It is now to be observed, as shown in Figs. 2, 4 and 5, that the shaft 31 lies in a plane above the spiderlike plate 47; projects between two of the chutes 46, and has an inner end bearing in the lug 60 cast with the spiderlike plate 47.

Secured to the shaft 31 by a pin 61 is a bevel gear 62, which projects through a slot 63, meshing with a bevel gear 64 secured to the valve 49, the valve and its gear being suspended in their operative position by a screw bolt 65, passing axially therethrough and screwthreaded in the plate 47 and about which the valve and its gear are revolved.

The location of the driving-shaft and gear in a plane above the rotating valve 49, instead of below, as heretofore, for timing the movement of the valve, is a condition precedent to and necessary for utilizing a chute connecting the valve with the spout 51ª by means of a chute of a diameter small enough to prevent potato pieces from rebounding therein and thereby insuring uniformly and continuously the spacing of the potato pieces in the ground and for the reason that the diameter of a chute small enough for this purpose must not be substantially greater than that of the opening in the valve and revolve with the valve and preferably center with the spout to prevent the potato pieces from rebounding in the latter.

In other words, by mounting the gearing for driving the valve in a plane above instead of below the same, I am enabled to rigidly secure to the valve surrounding its opening 50, a materially and substantially smaller spout 51ª than heretofore, the upper end of which spout conforms to said opening and the diameter of which at no point is more than the greatest diameter of the valve opening and which is not only suspended in its entirety at its upper end by the valve, but projects into the spout on an axis substantially common to both or so nearly so that the potato pieces are directed through the spout into their furrow, without striking with a rebound on the walls of the spout, while at the same time the chute 51 revolves with the valve and with the latter registers at its upper end successively with the several chutes through which the severed potato pieces descend from the severing blades.

For the operation of the machine as it is driven forward, the operator in the seat 53 drops into the two hoppers one large or two small potatoes, as there may be in the bins, and which are thereafter alternately acted upon by the plungers which force them past the severing knives, which cut the single large potatoes into quarters and each of the two small potatoes into halves, the pieces of which are pushed between the crossed blades, whence they descend to contact with the disc valve, on which, as before stated, there remain temporarily at rest at least three cut quarters or halves of one large or two small potatoes, and from which disc valve they are successively discharged through the valve opening 50 and drop thence through the chute 51 and the spout 51ª into the furrow provided for by the plow 15, and are covered by the disc 22, the interval of time for their passage from the valve into the furrow corresponding with the intervals at which they are discharged from the valve and timed, as is the valve, through its gear connections with the driving shaft 12 of the machine.

In conclusion, it should be understood that my invention, in providing for the use of hoppers adapted as they are, for the severing of two small potatoes in halves, as well as large potatoes in quarters, is not limited to the details of construction herein shown and described, but includes any construction by which a potato planting machine is adapted for the severing of two small potatoes in halves, each of which is conducted through a rotating disc valve provided with a single discharge opening; and that my invention also broadly includes a rotating valve provided with a single discharge chute revolving therewith.

Having described my invention, what I claim and desire to secure by Letters Patent is:

1. A potato planter comprising in combination crossed severing blades a plurality of elongated hoppers, provided with end plates and intermediate opposing flexible fingers, and means for adjusting said fingers towards and from each other.

2. A potato planter comprising in combination a fixed hopper crossed severing blades, a chute for each opening between said blades, a revolving disc valve common thereto, and an operating gear for said valve located in a plane above the same.

3. A potato planter, comprising in combination crossed severing blades, a chute for each opening between said blades, a revolving disc valve, and a discharge chute for and rotatable about the axis of said valve.

4. A potato planter, comprising in combination crossed severing blades, a chute for each opening between said blades, a revolving disc valve, a discharge chute for and secured to and rotatable with said valve.

5. A potato planter, comprising in combination crossed severing blades, a chute for each opening between said blades, a revolving disc valve, provided with a single opening, and a discharge chute secured to the valve surrounding and conforming to said opening.

6. A potato planter, comprising in combination crossed severing blades, a chute for each opening between said blades, a revolving disc valve, provided with a single opening, and a chute conforming to said opening secured to said valve, the discharging end of which chute surrounds the axis of rotation of the valve.

In witness whereof, I have hereunto set my hand and affixed my seal, this 25th day of March, A. D. 1920.

JOSEPH P. DAVENPORT. [L. S.]